June 18, 1963

G. R. DEMPSTER ETAL
FRONT END LOADERS 3,094,231

Original Filed May 28, 1957

INVENTORS
George R. Dempster, and
William A. Herpich

BY

ATTORNEYS

June 18, 1963 G. R. DEMPSTER ETAL 3,094,231
FRONT END LOADERS
Original Filed May 28, 1957 4 Sheets-Sheet 3
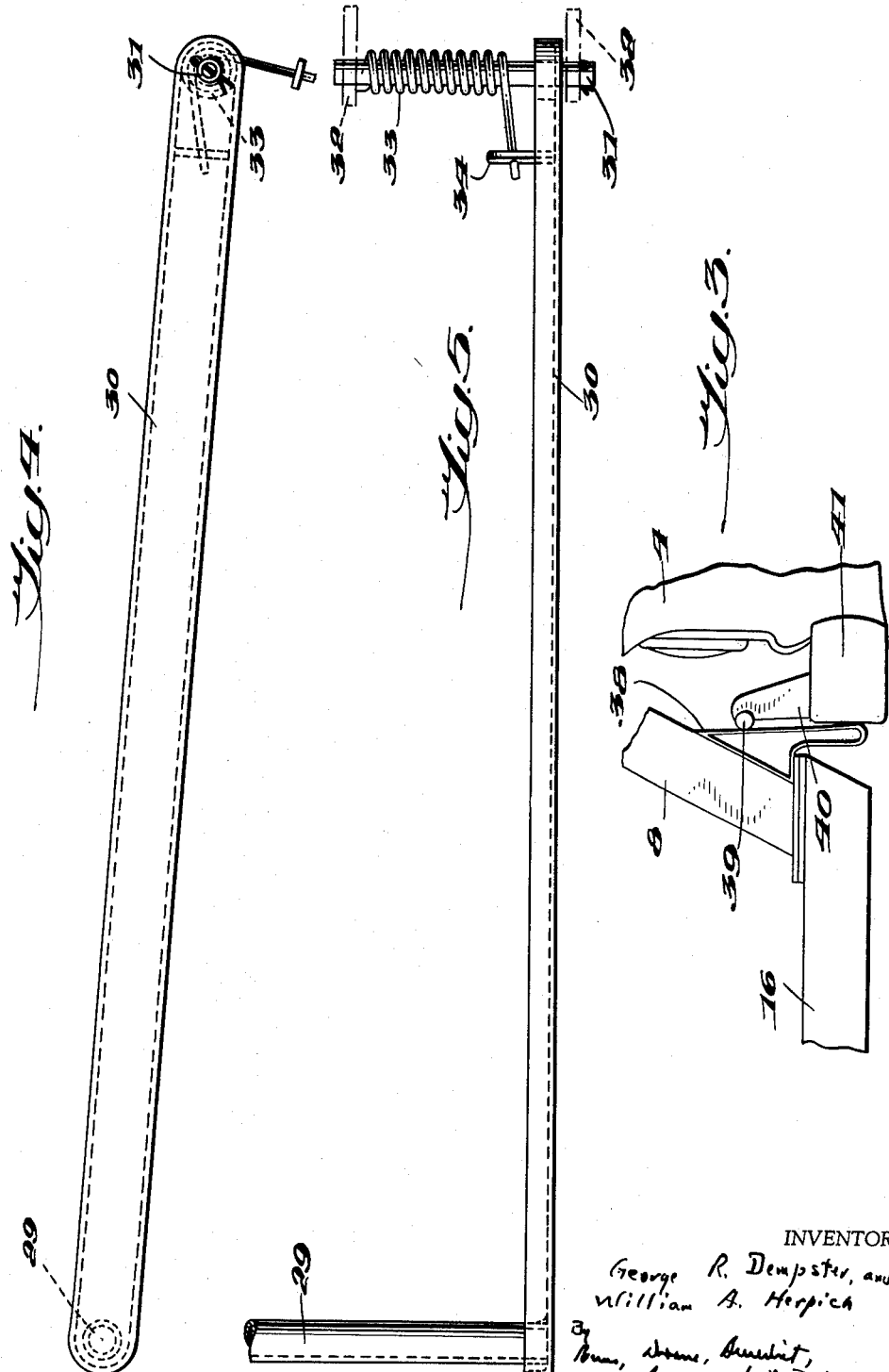
INVENTORS
George R. Dempster, and
William A. Herpich
By
ATTORNEYS June 18, 1963
G. R. DEMPSTER ETAL
3,094,231
FRONT END LOADERS
Original Filed May 28, 1957
4 Sheets-Sheet 4
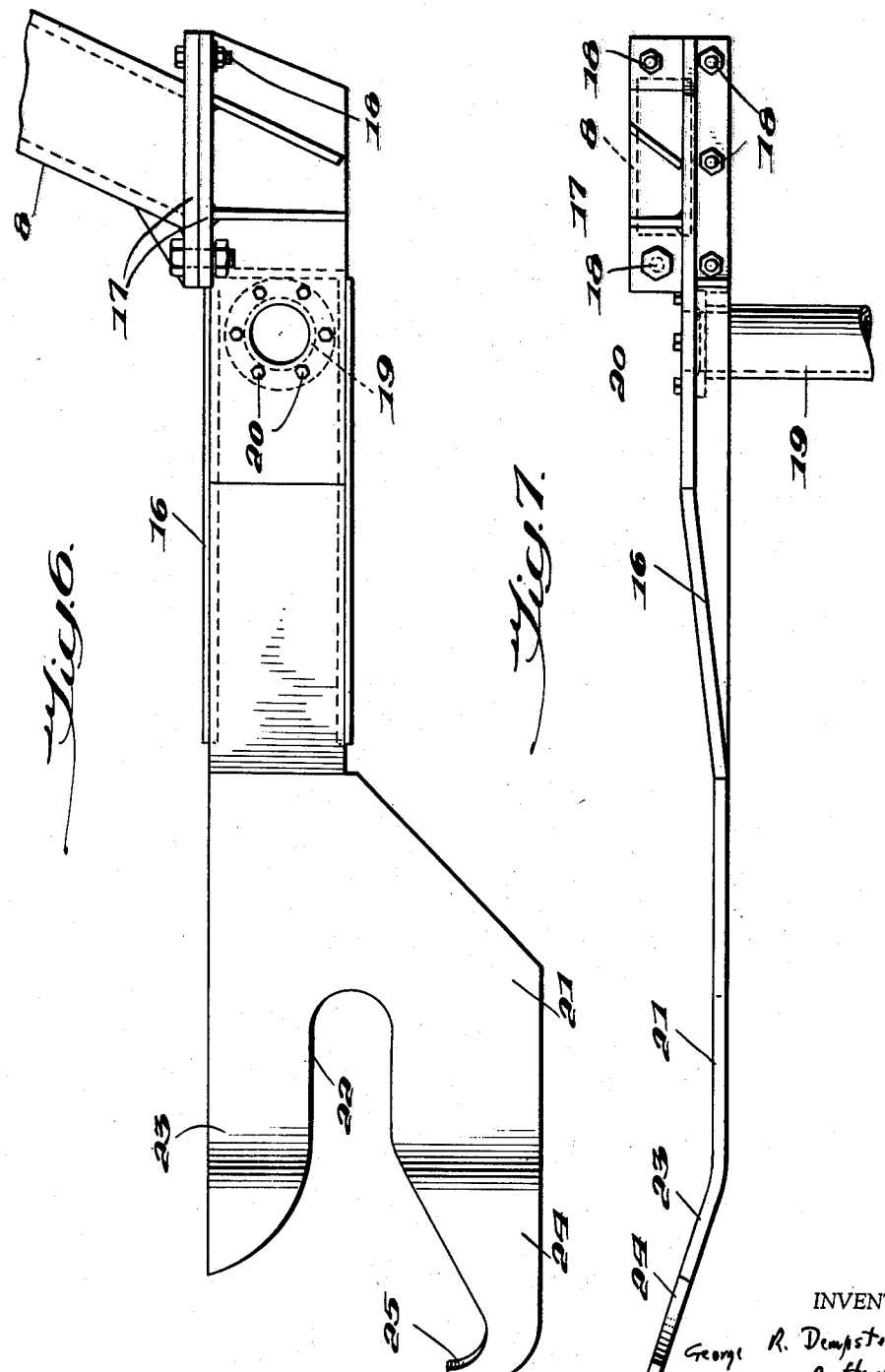
INVENTORS
George R. Dempster, and
William A. Herpich
BY
ATTORNEYS

United States Patent Office 3,094,231
Patented June 18, 1963

3,094,231
FRONT END LOADERS
George R. Dempster and William A. Herpich, Knoxville, Tenn.; said Herpich assignor to Dempster Brothers, Inc., Knoxville, Tenn., a corporation of Tennessee
Original application May 28, 1957, Ser. No. 662,252, now Patent No. 2,900,096, dated Aug. 18, 1959. Divided and this application May 21, 1959, Ser. No. 814,890
11 Claims. (Cl. 214—302)

This application is a division of our prior application, Serial No. 662,252, filed May 28, 1957, now Patent No. 2,900,096, granted August 18, 1959.

This invention relates to improvements in Front End Loaders of the character used for picking up containers at the front of a motor vehicle and dumping the contents therefrom into the body of the vehicle.

It has been proposed heretofore that dumping equipment be mounted on a motor vehicle having a refuse body with a device mounted on the front portion of the vehicle adapted for engagement selectively with containers which may be approached at the front of the vehicle for picking up a container automatically and lifting the container over the front portion of the vehicle and for dumping the contents into the body. Such devices, however, as proposed heretofore, have been complex of structure and operation, expensive to manufacture and use, objectionable in the character of dumping action provided, and generally have been unsatisfactory in many respects.

It has been the usual practice to support the lifting means on arms that extend beside the cab of the truck, either outside the fenders or over the fenders in close proximity to the cab. These arms are power operated, usually by hydraulic hoists. Where the arms are located in close proximity to the lateral sides of the cab, there is serious danger of injury to the operator through the manipulation of the arms, in the event that the operator may reach out with an arm or with his head through an open window at the side of the cab.

The disposition of the lifting arms laterally on the outside of the cab is objectionable also due to the lateral restriction in the overall width of the device, especially if the width of the cab be made substantially as wide as permitted for operation over highways. It is frequently desirable that the width of the cab be increased to the maximum extent. Where such lateral dimensions are obtained in the width of the cab itself, there is not sufficient width available for the disposition of lifting arms laterally on the outside of the cab, for travel over highways as usually required. Nevertheless, no practical solution to this problem has been suggested heretofore.

One object of this invention is to overcome the foregoing objections to front end loaders as proposed or manufactured heretofore, and to improve the construction thereof.

Another object of the invention is to provide in a front end loader for the picking up and dumping of a container without interference by the lifting arms either with the operation of the vehicle or the width of the cab portion of the truck.

Still another object of the invention is to provide in a front end loader for the picking up and dumping of separate containers by lifting arms that extend in gooseneck fashion over the cab of the truck, with substantially no embracing relation of opposite sides of the cab.

Still another object of the invention is to improve the construction of front end loaders by reducing the cost of manufacture and of operation without increasing the overall width of the truck nor interfering with the operation thereof, nor risking injury to an operator in the manipulation of the loading structure.

These objects may be accomplished, according to certain embodiments of the invention, by the provision of lifting arms mounted on the truck in front of the body thereof and at the rear of the cab, but constructed in gooseneck shape so as to extend over the roof of the cab and down at the front, in such position as to pick up a separate container that may be sitting on the ground or on the supporting surface at the front of the vehicle. The pick-up operation, as well as the dumping operation, may be entirely automatic, the container being elevated to a position above the filling opening of the body and being held for dumping of the contents into the body. This action may be accomplished by hydraulic power devices or other suitable means which will provide for smooth and uniform motion of the lifting arms and container and effective discharge of the contents.

It is possible to handle many different types of containers by this assembly and to discharge the contents therefrom into the body. For example, a container may be used which requires its inversion in an elevated position for flow of the contents therefrom downwardly into the body. Adequate means is provided for supporting the container in the elevated position and for insuring of proper dumping thereof. Thereafter the container can be returned to its lowered position in front of the vehicle, or transported on the lifting arms to a remote point where it may be set down for refilling.

These embodiments of the invention are illustrated in the accompanying drawings, in which:

FIG. 3 is an enlarged detail side elevation of the shock arrester provided on the lifting arm and vehicle;

FIG. 4 is an enlarged detail side elevation of the throw arms for dumping the container;

FIG. 5 is a partial top plan view thereof;

FIG. 6 is an enlarged detail side elevation of one of the pick-up arms; and

FIG. 7 is a top plan view thereof.

The invention is shown as applied to a motor vehicle of conventional form, merely as an example of the type of vehicle on which this loading device may be used. It has been customary heretofore to utilize a vehicle chassis of the character generally indicated by the numeral 1 and which is self-propelled under control of an operator on road mounted wheels, such as the front and rear wheels indicated generally at 2 and 3. The cab is shown at 4 within which the operator is located. Usually the cab 4 has an access door 5 through each opposite side thereof, and the door 5 usually has a window 5' therein.

A refuse body is shown at 6 on the chassis 1. This may be any suitable type of body adapted to receive refuse therein, such as garbage, trash and the like, and may be of the character that is provided with packer means to compress the refuse as it is deposited in the body. It is preferred that a body be used of the type having a filling opening or hopper, indicated at 7, in the top near the front, through which the refuse may be deposited into the body. The character of the body otherwise may be varied as desired.

Figure 1:
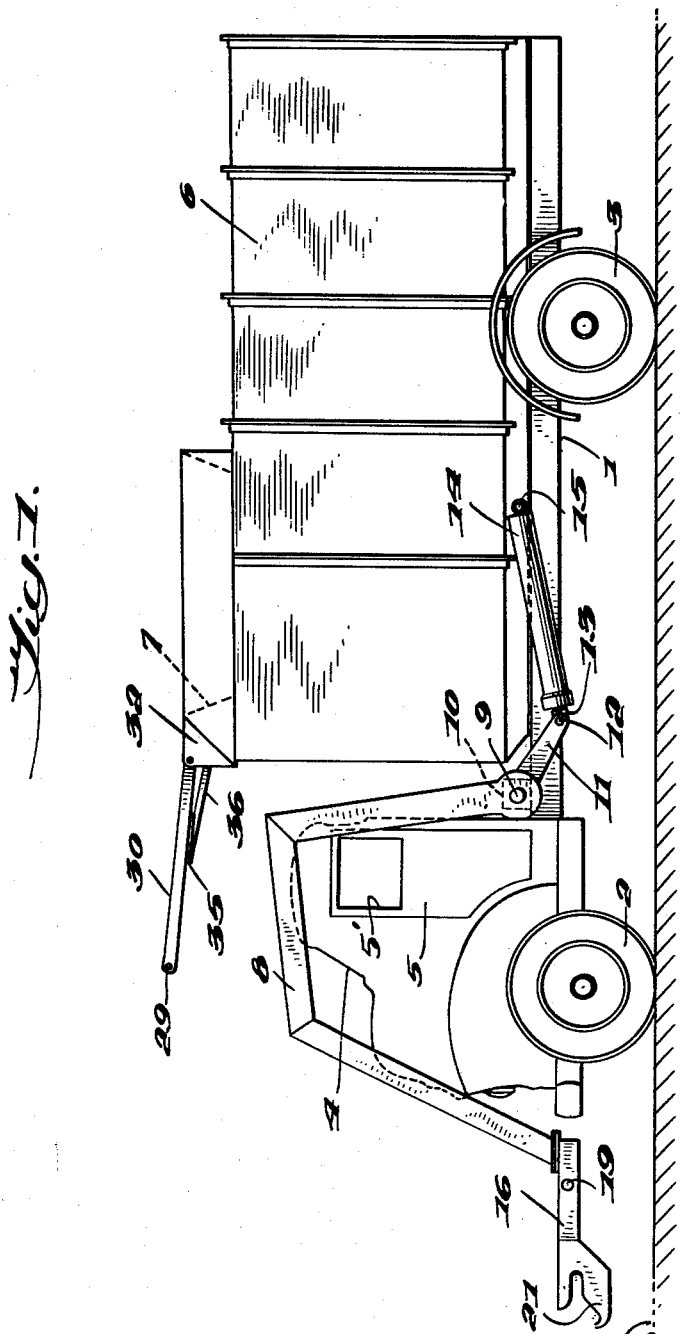
FIG. 1 is a side elevation of a vehicle having a refuse receiving body thereon and illustrating one form of front end loader mechanism that may be used in connection therewith.
Figure 2:
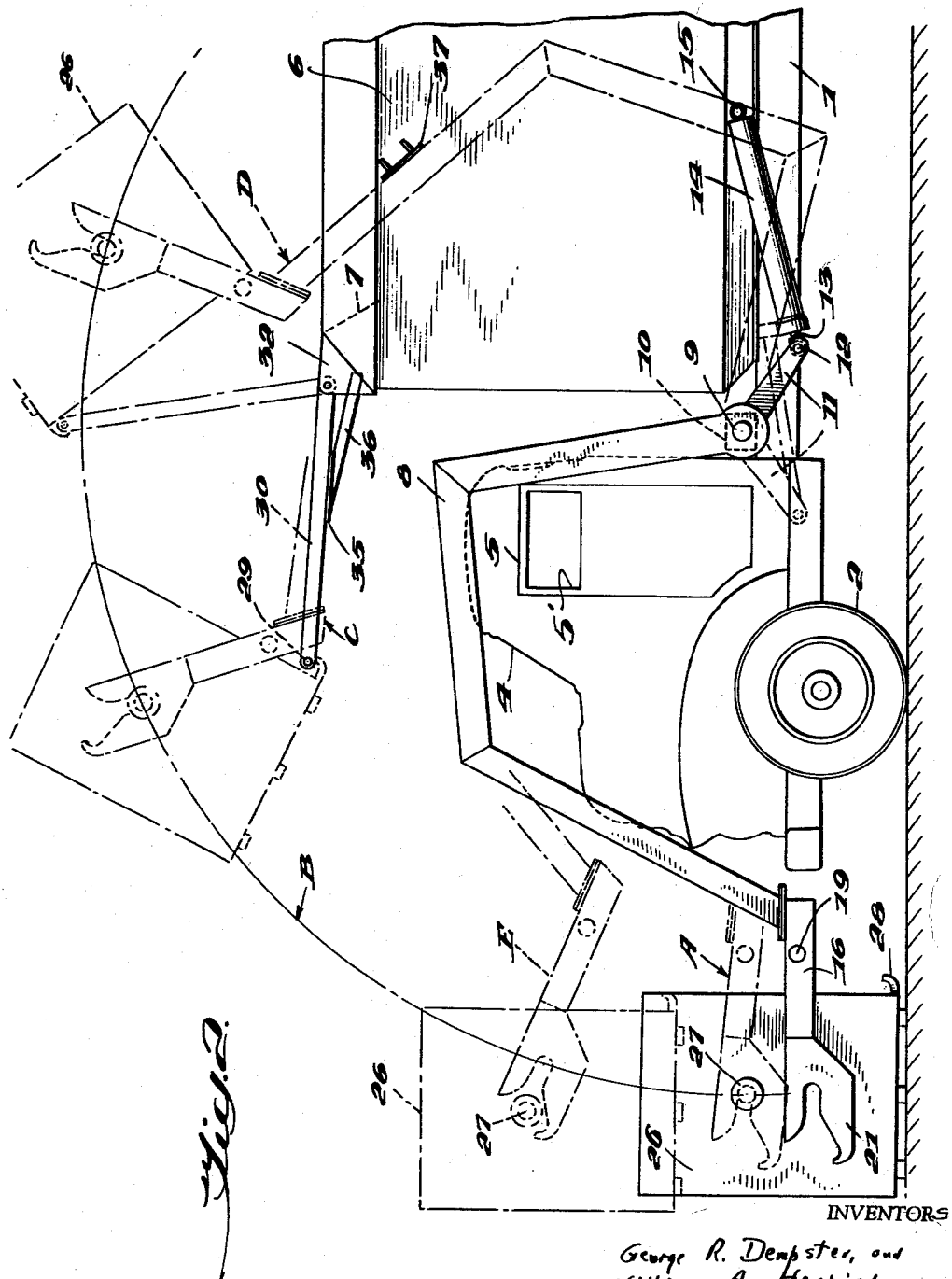
FIG. 2 is a similar view, showing in dotted lines the several positions of the lifting arms and container.

Referring to the form of the invention illustrated in FIGS. 1 to 7, the loader structure comprises a pair of lifting arms 8 spaced apart a distance substantially corresponding with the width of the cab 4. These arms 8 are preferably of gooseneck shape or of inverted U-shape, so as to extend over the top and downwardly in front and back of the cab 4 at the front portion of the truck, substantially as illustrated in FIGS. 1 and 2. The arms should clear the cab fully and should be located within the lateral confines of the vehicle, but the dimensions of the arms should be kept as reasonably close as practicable to the sides and top of the cab. Each of the arms may be formed of fabricated structure, either square or round in cross section and preferably tubular, for sufficient strength and rigidity and yet lightness in weight, as desired.

The arms 8 extend downward at the back of the cab 4, with their lower ends fixed on a torque tube 9 extending transversely of the vehicle and suitably journaled on the chassis frame 1. Journal boxes are shown at 10 in FIGS. 1 and 2 for mounting the torque tube 9 on the chassis, although any suitable or desired means may be used for the purpose. Lever arms 11 are fixed on the torque tube 9 and extend downwardly therefrom. The free ends of the lever arms 11 are pivotally connected at 12 with the outer ends of piston rods 13 provided in hydraulic cylinders 14 at opposite sides of the chassis. Each cylinder 14 may be pivoted at 15 to the base of the body 6 on the chassis frame 1 in a suitable bearing bracket thereon.

At its forward end, each lifting arm 8 is connected with a pick-up arm 16, shown more in detail in FIGS. 6 and 7. Each pick-up arm 16 is secured in abutting relation against the lower end of the lifting arm 8 by mounting pads 17 welded or otherwise secured to the arms 8 and 16 in position for abutment against each other, where they are held detachably in secure relation by bolts 18. Thus, the arm 16 is held rigidly to the lower end of the lifting arm 8, but is capable of ready separation and replacement when needed.

The pick-up arms 16 preferably are fabricated, as shown in FIGS. 6 and 7, for sufficient sturdiness and strength according to the loads that are to be lifted thereby. These pickup arms are braced transversely by a cross member 19 extending therebetween in abutting relation with the inner faces of the pick-up arms, as shown in FIG. 7. This cross member is detachably secured to the arm 16 by bolts 20, so as to permit of separation when it may be needed to replace one of the arms 16.

Each of the arms 16 is provided with means at the outer end thereof for engaging and lifting an adjacent end of a separate container. In the form shown in FIGS. 1 to 7, this lifting means comprises a yoke, generally indicated at 21, fixed rigidly on the outer end of the arm 16. The yoke 21 comprises a plate having a recess 22 in the outer end thereof and with upper and lower tines 23 and 24 on opposite sides of the recess. The lower tine 24 has an upturned hook portion 25 on the outer end thereof for hook engagement with a lifting pin on the end of the container, as hereinafter explained, to prevent accidental displacement of the container therefrom. This lower tine preferably is bent laterally, as shown in FIG. 7, to facilitate the guiding of the lifting pin into the slot 22.

One form of container is shown in FIG. 2 and is indicated generally at 26. This form of container has closed sides and bottom and with an open top that may be provided with lids, if desired. The container is usually made of a length substantially corresponding with the width of the vehicle or the space between the lifting arms 8. Mounted on opposite ends of the container 26 are lifting pins 27.

The container 26 is also provided on the side thereof toward the vehicle with a coupling 28 to facilitate dumping. This coupling 28 is substantialy a J-shaped piece fixed to the side wall or bottom of the container and projecting outwardly therefrom in a position to be disposed toward the vehicle when the loading mechanism is in position for picking up the container. One such coupling 28 may be used intermediate the length of the container, or more of these spaced at intervals therealong, if found desirable.

The coupling 28 is in position to engage a contact rod or tube 29 disposed substantially at the level of the top of the body 6, as shown in FIG. 2 and illustrated more in detail in FIGS. 4 and 5. The rod or tube 29 extends transversely of the vehicle, spaced above the cab 4, and is supported at its opposite ends on lever arms 30. Each of the lever arms 30 is journaled on a hinge pin 31 that extends transversely between a pair of journal plates 32 secured to the front end portion of the body 6 at the top thereof. A torsion spring 33 is wound on the journal pin 31, being secured at one end to said journal pin and at its opposite end at 34 to the adjacent lever arm 30, normally tending to move the lever arm in a downward direction, as illustrated in full lines in FIG. 2. The lever arm 30 is adapted to be supported in its normal position upon a rest plate 35 (FIG. 2) carried by a supporting arm 36 extending outwardly from the adjacent plate 32 on the body 6 and anchored thereto.

The pick-up arms 16 are shown in full lines in FIG. 2 in their lowered positions where they may be carried, if desired, during operation of the vehicle, and to accommodate larger containers than that illustrated at 26 in the drawings. For the size of container 26, the yokes 21 would be raised, if needed, to the height of the lifting pins 27 on the container, which is the position illustrated at A in FIG. 2. With the yokes 21 in the proper position for alignment with the lifting pins 27, the vehicle can be moved forward for entry of the lifting pins on the container into the yokes. It is preferred that this position be such that the pick-up arms 16 are standing somewhat in an inclined direction at this point, whereby the weight of the container and its contents will tend to hold the container in the slots 22 in the yokes, with no danger of the container falling out of the yokes. If however, the container should rock outward, the hook-shaped portions 25 on the tines 24 would tend to retain the lifting pins against separation from the yokes.

The arms 8 are operated by the hydraulic hoists 14 and may be moved from the pick-up position, such as that indicated at A in FIG. 2, upwardly through the arc, indicated generally at B. When the arms reach the position shown at C, the coupling 28 on the container 26 will engage the contact tube 29 which is normally held by the arms 30 in the position shown in full lines in FIG. 2. The further upward movement of the container 26 beyond the position shown at C will cause the coupling 28 on the lower end of the container to be engaged by the contact tube 29 and held thereby, so as to rotate the container on the lifting pins 27 during the continued upward movement of the arms to the dumping position indicated at D. In this position, the arms may be limited in their stroke by stop brackets 37 on opposite sides of the body 6, if needed.

When the container 26 reaches the dumping position D in FIG. 2, it has been turned substantially upside down for discharging the contents through the filling opening or hopper 7 in the top of the body 6. Then, upon removal of the hoists 14, the container is lowered and may be set down on the ground or on the floor surface for refilling. The container can be carried, either in its inverted position, as shown at D in FIG. 2, or in any desired intermediate position, elevated slightly during transportation to the point of refilling, if needed. However, the normal operation contemplates the picking up and dumping of the container at the point of filling, after which it is set down again in the same position.

Another dotted line position is indicated at E in FIG. 2, representing the position of the pick-up arms 16 when raised to engage the lifting pins of a container that is mounted at a substantial height above the surface on which the vehicle travels. For example, the container 26 may be sitting on a loading dock, as shown at the position E, and yet the pick-up arms 16 can be moved into engagement therewith for picking up the container and dumping its contents into the hopper of the body 6 in the manner illustrated in the drawings.

While the raising and lowering operation of the lifting arms 8 will be smooth and uniform under the power applied thereto by the hydraulic hoists 14, provision may be made, if desired, for absorbing the shock incident to the lowering of the lifting arms and yieldably holding these arms in their normal carrying position. An example of such means is illustrated in detail in FIG. 3. In this embodiment, each lifting arm 8 is shown as provided with a shock arrester plate 38 depending therefrom and extending downwardly in a loop. The plate 38 is located substantially at the level of the pick up arm 16 and in position for frictional and yieldable engagement with a tube or rod 39 mounted on a bracket 40 carried by the bumper 41 of the vehicle.

As the lifting arms 8 are lowered substantially to the full line position shown in FIG. 2, the shock arrester plate 38 engages the tube or rod 39 to transfer shock from the lifting arms to the truck body and thereby eliminate the possibility of resistance causing bending of the lifting arms. The shock arrester plate 38 travels in an arc having a center on the axis of the torque tube 9 to follow the same arc of descent as the lifting arm 8. In case of sharp resistance in engaging the container for pick up, the shock arrester plate will absorb this resistance and tend to prevent bending of the lifting arms. In most instances, the shock arrester will not be needed, but may be used where desired and where substantial resistance may be encountered.

With the form of the invention, as illustrated and described, it is possible for the pick-up arms to engage and dump a container automatically, with the container sitting on the ground or other surface in front of the vehicle or at any desired elevation above the surface on which the vehicle rests. For example, the container may be sitting on a loading dock at a height of several feet above the vehicle and yet the pick-up arms can be moved into engagement therewith for lifting and dumping the container into the body of the vehicle.

In all instances, the lifting arms 8 are shaped in the form of a gooseneck, so as to extend over the top of the cab 4 of the vehicle, leaving the side doors 5 and the windows 5' thereof free of obstruction. Not only does this permit of freedom of ingress and egress, but it also avoids the danger to the truck operator through manipulation of the lifting arms. At the same time, the mechanism provides for smooth and uniform operation in picking up and dumping a container and returning it to its filling position on the ground or other surface.

The construction is materially simplified, as well as improved, and does not require the manipulation of separate sections of lifting arms, but on the contrary the lifting arms can be kept in sturdy and rigid fashion due to their substantially integral construction.

While the invention has been illustrated and described in certain embodiments, it is recognized that other variations and changes may be made therein without departing from the invention as set forth in the claims.

We claim:

1. In a front end loader of the character described, the combination with a motor vehicle chassis including a chassis frame, a cab and a refuse body on the chassis frame, of loading mechanism on the vehicle comprising a pair of lifting arms extending over the top of the cab and downwardly at the front thereof, means pivotally mounting the rear end portions of the lifting arms on the vehicle for upward swinging movement, power means connected with the lifting arms for causing upward lifting movement thereof, pick-up arms supported by the front end portions of the lifting arms and having means thereon for detachable engagement with a container to lift the container to an elevated position over the body and for dumping the contents thereof into the body, and means detachably connecting the pick-up arms with the lifting arms for removal and separation therefrom.

2. In a front end loader of the character described, the combination with a motor vehicle chassis including a chassis frame, a cab and a refuse body on the chassis frame, of loading mechanism on the vehicle comprising a pair of lifting arms extending over the top of the cab and downwardly at the front thereof, means pivotally mounting the rear end portions of the lifting arms on the vehicle for upward swinging movement, power means connected with the lifting arms for causing upward lifting movement thereof, pick-up arms supported by the front end portions of the lifting arms and having means thereon for detachable engagement with a container to lift the container to an elevated position over the body and for dumping the contents thereof into the body, and means on the vehicle body in position for operative engagement with the container for causing dumping movement of the container when moved to a position substantially over the vehicle body.

3. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movement about a substantially horizontal axis, means for swinging said lifting arms simultaneously about said axis between a lowered position in which said lifting arms extend forwardly to a location in front of said cab and a raised position in which said arms extend upwardly to a location near the top of said body, and pick-up arms at the front end portions of said lifting arms and having means for detachable connection with a container for supporting the container for dumping movement, each of the lifting and pick-up arms having abutting end faces in opposed relation to each other, and detachable fastenings connecting said opposed faces together.

4. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movement about a substantially horizontal axis, means for swinging said lifting arms simultaneously about said axis between a lowered position in which said lifting arms extend forwardly to a location in front of said cab and a raised position in which said arms extend upwardly to a location near the top of said body, pick-up arms at the front end portions of said lifting arms and having means for detachable connection with a container for supporting the container for dumping movement, each of the lifting and pick-up arms having abutting end faces in opposed relation to each other, detachable fastenings connecting said opposed faces together, and a cross member extending between the pick-up arms and rigidly secured thereto at its opposite ends.

5. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis, means for swinging said lifting arms simultaneously about said axis between a lowered position in which said lifting arms extend forwardly to a location in front of said cab and a raised position in which said arms extend upwardly to a location near the top of said body, pick-up arms at the front end portions of said lifting arms and having means thereon for detachable engagement with a separate container for lifting the container to a dumping position with respect to the body, each of the lifting and pick-up arms having mounting pads in opposed abutting relation to each other at the adjacent ends thereof, and means detachably connecting the mounting pads together for separation and removal of the pick-up arms from the lifting arms.

6. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis, means for swinging said lifting arms simultaneously about said axis between a lowered position in which said lifting arms extend forwardly to a location in front of said cab and a raised position in which said arms extend upwardly to a location near the top of said body, pick-up members at the front end portions of said lifting arms and mounted thereon and having means thereon for detachable engagement with a separate container for lifting the container to a dumping position with respect to the body, each of the lifting and pick-up arms having mounting pads in opposed abutting relation to each other at the adjacent ends thereof, means detachably connecting the mounting pads together for separation and removal of the pick-up arms from the lifting arms, and a cross member extending between the front end portions of the lifting arms in permanently fixed relation thereto at opposite ends of said cross member.

7. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis, means for swinging said lifting arms simultaneously about said axis between a lowered position in which said lifting arms extend forwardly to a location in front of said cab and a raised position in which said arms extend upwardly to a location near the top of said body, pick-up arms supported by the front end portions of said lifting arms and having means thereon for detachable engagement with a separate container for lifting said container to a dumping position with respect to the body, and means for dumping said container when raised to said dumping position with respect to the body, said dumping means being connected with the body in the path of movement of the container and arranged in operative position for engagement with a portion of a container.

8. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, pick-up arms supported by the front end portions of said lifting arms and having means thereon for detachable engagement with a separate container for lifting said container to a dumping position with respect to the body, means for dumping said container when raised to said dumping position with respect to the body, said dumping means including a pair of arms connected with the body at one end and extending outwardly therefrom, and a cross member connecting the outer ends of said arms together in position for engagement by a portion of the container for causing automatic dumping of the container when lifted to dumping position.

9. In a front end loader of the character described, the combination with a motor vehicle including a refuse body and a cab at the front thereof, said body having an opening in the upper portion thereof for receiving refuse, of loading mechanism on the vehicle comprising a pair of lifting arms extending downwardly and forwardly at the front of the cab, means pivotally supporting the lifting arms on the vehicle for upward swinging movement relative to the body, means on the front end portion of the lifting arms for supporting a container to lift the container to a dumping position relative to the body opening, a cross member extending between the container supporting means on the front end portions of the lifting arms in rigid relation thereto for holding the front end portions of the lifting arms in fixed relation to each other, and means for swinging the container relative to the lifting arms in proximity to said body opening.

10. In a front end loader of the character described, the combination with a motor vehicle including a refuse body and a cab at the front thereof, said body having an opening in the upper portion thereof for receiving refuse, of loading mechanism on the vehicle comprising a pair of lifting arms extending downwardly and forwardly at the front of the cab, means pivotally supporting the lifting arms on the vehicle for upward swinging movement relative to the body, pick-up arms on the front end portion of the lifting arms for supporting a container to lift the container to a dumping position relative to the body opening, a cross member extending between the pick-up arms in rigid relation thereto for holding the front end portions of the lifting arms in fixed relation to each other, and additional means for moving the container relative to the lifting arms in proximity to said body opening.

11. In a front end loader of the character described, the combination with a motor vehicle including a refuse body and a cab at the front of the body, of loading mechanism on the vehicle comprising a pair of lifting arms extending over the top of the cab and downward at the front of the cab, means mounting the arms on the vehicle for upward movement relative thereto, means on the front end portions of the lifting arms, in fixed relation to said lifting arms, for engagement with a container to lift the container to dump the contents into the body, and means for applying a yielding action against said front end portion of the lifting arms adjacent said container pick-up means during the initial container engaging action.

References Cited in the file of this patent

UNITED STATES PATENTS

| | | |
|---|---|---|
| 2,565,792 | Wagner et al. | Aug. 28, 1951 |
| 2,624,478 | Kaplan | Jan. 6, 1953 |
| 2,711,256 | Cutler | June 21, 1955 |
| 2,819,874 | Belec | Jan. 14, 1958 |
| 2,828,032 | Beasley et al. | Mar. 25, 1958 |
| 2,885,101 | Aldrege et al. | May 5, 1959 |
| 2,900,096 | Dempster et al. | Aug. 18, 1959 |